Dec. 5, 1961   F. A. CERETTI ET AL   3,011,563
GROUND SURFACE PERFORATING DEVICE
Filed March 18, 1960
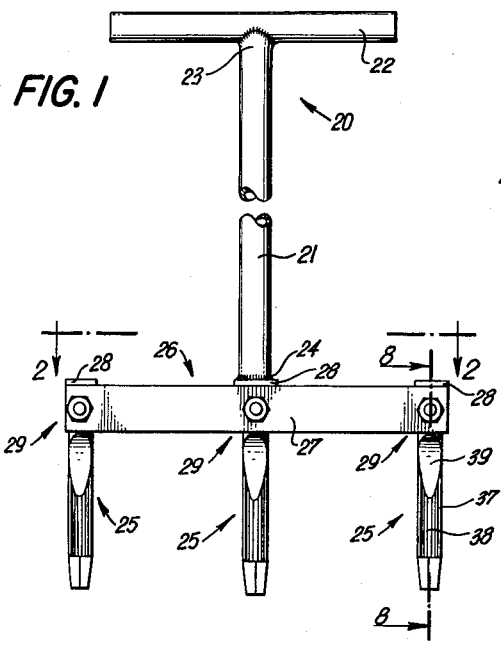
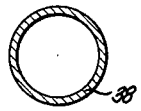
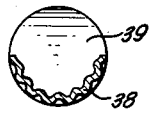
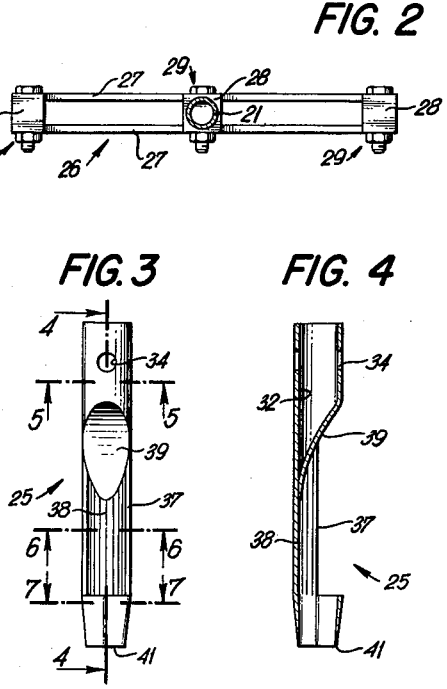
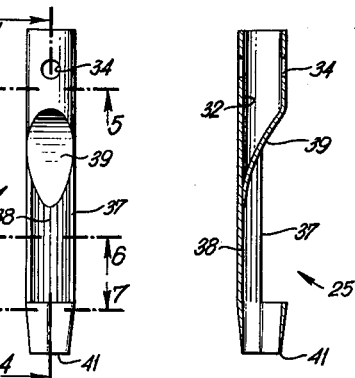
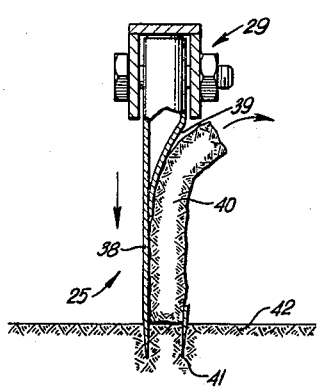
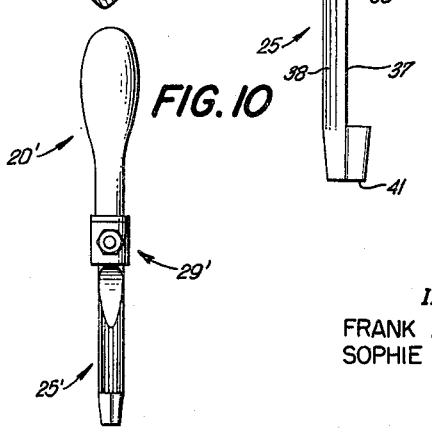
INVENTORS.
FRANK A. CERETTI
SOPHIE CERETTI

3,011,563
GROUND SURFACE PERFORATING DEVICE
Frank A. Ceretti and Sophie Ceretti, Anaheim, Calif., assignors of one-tenth to Gadget-Of-The-Month Club, Inc., North Hollywood, Calif., a corporation of California
Filed Mar. 18, 1960, Ser. No. 15,913
1 Claim. (Cl. 172—22)

The present invention consists of a ground surface perforating device adapted to produce one or more holes in a ground surface such as grass turf, or the like, although not specifically so limited, for providing access to subsurface portions of the ground or grass turf generally in a root area region thereof for providing access to said root area region of water, fertilizer, air, or any other desired fluid, liquid, or solid material and/or mixtures or combinations thereof for various agriculturally and/or horticulturally desirable purposes.

In a preferred form of the present invention, the device includes one or more hollow longitudinal ground-penetrating and coring elements adapted to be forced downwardly into a ground surface or grass turf to a desired distance whereby to force upwardly within the hollow interior of the ground-penetrating and/or coring element a core of earth, grass turf, or the like, which will be removed from the hole formed by the ground-penetrating and coring element when it is removed therefrom, whereby to leave a hole extending downwardly into the ground or grass turf for the purposes mentioned above. It should be understood that the device of the present invention may include one or more of such ground-penetrating and coring elements whereby to produce one or more cored holes extending downwardly into the ground or grass turf after removal of the device therefrom.

It should also be noted that, in a preferred form of the present invention, each of the ground-penetrating and coring elements is provided with a lateral core-ejection opening and positioned opposite said core-ejection opening, an inclined wedge surface means adapted to forcibly eject the core of ground or grass turf from within the hollow interior of the ground-penetrating and coring element when said core is vertically moved upwardly against said wedge surface means; this core ejection operation normally occurring during the next subsequent ground-penetrating and coring insertion of the coring element downwardly into the ground surface or grass turf, which causes the next core to move upwardly within the hollow interior of the coring element in a manner such as to force the previous core upwardly against the wedge surface and laterally out of the core-ejection opening and thence onto the surface of the ground or grass turf, which will have the effect of providing a very thin layer of soil thereover after being spread out. In other words, the preferred form of the present invention has a substantially automatically operable core-ejection means requiring no individual attention on the part of a user of the device for the purpose of ejecting cores of removed earth, grass turf, or the like.

It should also be noted that, in a preferred form of the present invention, the ground-penetrating and coring element (or plurality thereof) may be removably and interchangeably engaged with respect to a handle means whereby to make it possible to change coring elements to any desired size, either with respect to length thereof or with respect to width thereof. Also, other types of coring elements may be interchangeably attached with respect to the handle means, if desired.

It is an object of the present invention to provide an improved perforating and/or coring and/or core-removing device of the character described above, which is provided with one or more coring elements having core-ejection means automatically operable to eject a core contained therein in response to the next ground-penetrating insertion thereof.

It is a further object to provide a device of the character set forth hereinabove, wherein each ground-penetrating and coring element is removably and interchangeably engaged with respect to a handle means to allow changing and/or selection and appropriate mounting of any desired type of coring element with respect to the handle means.

It is a further object to provide a device of the character set forth above including a plurality of the hollow longitudinal ground-penetrating and coring elements carried by transverse attachment means in substantially parallel transversely spaced downwardly directed relationship, and with said transverse attachment means being connected to the lower end of the handle means, which comprises a longitudinal upstanding handle, whereby to cause the entire device to assume a configuration generally similar to a multiple-tined spading fork, and adapted to be forced into the ground in a manner similar to the operation of such a spading fork, by the application of a user's foot to the transverse attachment means, which corresponds to the upper transverse portion of a conventional spading fork, whereby the multiple parallel downwardly directed ground-penetrating and coring elements may be forced downwardly into a ground surface or grass turf to a desired distance, after which they may be removed for the core-removing purposes described hereinbefore.

It is a further object to provide a device of the character referred to in any of the preceding objects, wherein the device assumes the form of a small manually operable tool having a manually graspable handle and a single downwardly directed ground-penetrating and coring element generally similar in overall size and in mode of use to a hand trowel, or the like, and being adapted for use around small plants including house plants, potted plants, and the like.

It is a further object to provide a device of the character set forth in any of the preceding objects, which is of extremely simple, cheap, foolproof construction such as to be conducive to widespread use of the device.

Further objects will be apparent to persons skilled in the art after a careful study hereof.

For the purpose of clarifying the nature of the present invention, two exemplary embodiments are illustrated in the hereinbelow-described figures of the accompanying drawing, and are described in detail hereinafter.

FIG. 1 is a fragmentary reduced-size front elevational view of one exemplary form of the invention wherein three ground-penetrating and coring elements are carried in a parallel manner by transverse attachment means centrally connected to an upwardly directed handle means (having a central portion removed for drawing size reduction purposes) whereby to comprise a configuration generally similar to a three-tined spading fork.

FIG. 2 is a top plan view of the transverse attachment means carrying the three coring elements and partly a cross-sectional view of the handle member taken in the direction of the arrows 2—2 of FIG. 1.

FIG. 3 is a larger scale front elevational view of a single exemplary type of longitudinal hollow ground-penetrating and coring element removed from the remainder of the device.

FIG. 4 is a sectional view taken in the direction of the arrows 4—4 of FIG. 3.

FIG. 5 is an enlarged cross-sectional view taken in the direction of the arrows 5—5 of FIG. 3.

FIG. 6 is an enlarged cross-sectional view taken in the direction of the arrows 6—6 of FIG. 3.

FIG. 7 is an enlarged cross-sectional view taken in the direction of the arrows 7—7 of FIG. 3.

FIG. 8 is an enlarged fragmentary, partly sectional, view taken in the direction of the arrows 8—8 of FIG. 1 and shows the removable and interchangeable engagement of a typical coring element with respect to a typical attachment means carried by the handle means.

FIG. 9 is a vertical sectional view quite similar to FIG. 8. However, this view shows the coring element in the act of being forced downwardly into a ground surface whereby to cause a previously removed core to be transversely ejected by wedge surface means through a core-ejection lateral opening in the coring element.

FIG. 10 is a reduced-size front elevational view of a modified form of the invention wherein it comprises a hand tool operable through the use of one hand and wherein it carries only a single coring element.

With reference to the figures, one specific exemplary embodiment of the invention (which is not to be construed in the limiting sense) takes a specific exemplary form including a longitudinal vertical upstanding handle means, indicated generally at 20, of hollow tubular construction including a vertical member 21 and a cross handle portion 22 carried at the upper end 23 of the vertical member 21, which has a lower attachment end 24, which is effectively provided with a plurality of hollow longitudinal ground-penetrating and coring elements, such as are indicated generally at 25. In the specific example illustrated in FIGS. 1–9 for exemplary purposes, the engagement of each of the coring elements 25 with respect to the attachment end 24 of the handle member 21 is accomplished by transverse attachment means, indicated generally at 26, consisting of two transverse bars 27 interconnected as indicated at 28 and centrally connected to the attachment end 24 of the vertical handle member 21, with the interconnecting members 28 of the spaced parallel transverse bars 27 being forwardly or downwardly provided with coring element-engaging means at each of the three locations indicated generally at 29 and, in the specific example illustrated, consisting of substantially cylindrical mounting pins 30, each of which is laterally transversely apertured as indicated at 31 and each of which is adapted to be inserted into and received by the corresponding recess means 32 at the upper end of each of the corresponding coring elements 25 in the manner best shown in FIGS. 8 and 9, after which threaded fastener means, such as the bolt 33 is passed through aligned apertures 34 carried by the recess means 32 and the aperture 31 of the mounting pin 30; the interiorly threaded nut 35 being then threadedly advanced onto the threaded portion 36 of the bolt 33 whereby to tightly fasten the entire assembly together in the manner best shown in FIGS. 8 and 9 whereby to firmly rigidly and yet removably interchangeably mount each coring element 25 in the relationship shown in FIG. 1 to the attachment means 26 whereby to provide a complete operative device similar in general appearance and configuration, and in ground-insertion operation, to a conventional three-tined spading fork.

It should be clearly understood that while only the right hand core or coring element 25 shown in FIG. 1 is illustrated in detail in FIGS. 8 and 9 whereby to fully show the removable attachment structure just described hereinabove, each of the other two coring elements 25, comprising the left coring element and the middle coring element 25 shown in FIG. 1, is similarly attached and it is thought that an additional showing of the attachment means thereof would be repetitive and redundant.

It will readily be understood that it will be easily possible to remove any of the coring elements 25 by merely disengaging the nut 35 from the bolt 33 and removing the recess means 32 from the mounting pin 30, after which any other desired type of coring element having a similarly sized recess means may be engaged and mounted on the mounting pin 30 and fastened by the bolt 33 and nut 35 in a manner similar to that described hereinbefore and shown in detail in FIG. 8. In particular, it should be noted that the forward coring part of each interchangeable coring element need not be of the same size as that shown in FIGS. 1–9 but may be of any desired size.

Each of the coring elements is provided with automatic core-ejection means which, in the specific example illustrated in FIGS. 1–9, takes the form of a core-ejection opening 37 in the wall of the tubing 38 of which each of the coring elements 25 is formed, and further includes an inclined wedge surface means 39 positioned within the hollow coring element 25 opposite the core-ejection opening 37 whereby a core, such as is indicated at 40 in FIG. 9, which has been forced upwardly into the hollow interior of the coring element 25 in a preceding coring operation, upon a subsequent coring operation comprising the downward insertion of a sharpened downwardly directed ground-piercing edge 41 into a ground surface 42, will cause the upper end of the previous core 40 to be forced upwardly against the outwardly inclined wedge surface 39, which will cause the core 40 to be laterally or outwardly automatically ejected through the core-ejection opening 37, after which the core 40 will fall upon the ground surface 42. In other words, after a first ground-penetrating and coring operation, the second such ground-penetrating and coring operation will cause each previous core to be automatically ejected from the corresponding coring elements 25.

It should be noted that, in one preferred form of the invention, as illustrated in FIGS. 1–9, the ground-piercing sharpened edge 41 is slightly inwardly tapered and is longitudinally ridged or fluted as indicated at 43 in a somewhat diamond-like configuration to provide increased stiffness and facilitate insertion thereof into the ground surface or grass turf 42.

It should also be noted that, in one specific preferred form of the invention, as illustrated in FIGS. 1–9, the tubular wall 38 of which each coring element 25 is formed, is longitudinally corrugated or fluted, as is best shown in FIG. 6 whereby to provide increased longitudinal stiffness to allow considerable force to be applied thereto to facilitate insertion thereof into the ground surface or grass turf 42.

In the specific form of the invention illustrated in FIG. 1, it will be noted that the center or middle coring element 25 is slightly longer than the two side coring elements 25 whereby to make it possible to pivot the entire device on the lower tip of the center coring element 25, if desired.

FIG. 10 illustrates a slight modification of the present invention wherein it comprises a small hand tool having a manually graspable handle 20′ adapted to be grasped by one hand, and wherein engaging means 29′ fastens the upper recessed end of a single coring element 25′ thereto in the same manner as the fastening of the engaging means 29 with respect to each of the coring elements 25 in the first form of the present invention previously described in detail with reference to specific figures of the drawing. Therefore, since the remainder of the device is substantially similar to the first form of the invention illustrated in FIGS. 1–9 and described in detail hereinbefore, further description of this modification is thought unnecessary and redundant.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

A ground surface perforating device, comprising: handle means having an upper end provided with a manually graspable portion and having a lower attachment end, said attachment end including transverse attachment means mounting and carrying in laterally spaced downwardly directed relationship a plurality of hollow longitudinal ground-penetrating and coring elements, with each coring element having side wall means terminating in a sharpened ground-piercing edge portion at the bottom end thereof and being provided with a lateral core-ejection opening and inclined wedge surface means positioned within the hollow coring element sealingly separating the lower and upper portions thereof and opposite said lateral core-ejection opening for forcing a core vertically moved against said wedge surface means laterally outwardly through said lateral core-ejection opening as a result of downward ground-penetrating movement of said coring element into an underlying ground surface, the side wall portion of each of said longitudinal coring elements being longitudinally ridged at a plurality of spaced locations to provide increased longitudinal stiffness thereof, and the edge portion at the bottom of each of said coring elements being substantially diamond-shaped; each of said longitudinal coring elements having a receiving recess in the upper end thereof and transverse aligned aperture means therethrough; said transverse attachment means comprising transverse parallel interconnected spaced bar means provided with downwardly directed transversely spaced mounting pins removably inserted into and received by the corresponding receiving recess means of each of the corresponding coring elements, and being provided with transverse aperture means therethrough adapted to be aligned with the transverse aperture means passing through the receiving recess means and being further provided with transverse controllably removable threaded retaining means extending therethrough for controllably removably and interchangeably locking each of said coring elements on the corresponding mounting pin.

References Cited in the file of this patent

UNITED STATES PATENTS

| | | |
|---|---|---|
| 28,014 | Scaife | Apr. 24, 1860 |
| 828,452 | Barry | Aug. 14, 1906 |
| 844,726 | Hunter | Feb. 19, 1907 |
| 2,638,831 | Ferguson et al. | May 19, 1953 |
| 2,809,067 | Macchi | Oct. 8, 1957 |

FOREIGN PATENTS

| | | |
|---|---|---|
| 107,002 | Australia | Mar. 22, 1939 |
| 589,237 | Great Britain | June 16, 1947 |